United States Patent [19]

Luscombe

[11] 3,933,314

[45] Jan. 20, 1976

[54] CHOPPING IMPLEMENT
[76] Inventor: Art Luscombe, Armstrong, Iowa
[22] Filed: Sept. 3, 1974
[21] Appl. No.: 502,554

Related U.S. Application Data
[63] Continuation of Ser. No. 331,824, Feb. 12, 1973, abandoned.

[52] U.S. Cl. ............ 241/60; 241/101.7; 241/186 R; 241/189 R
[51] Int. Cl.² ...................................... B02C 13/286
[58] Field of Search... 241/60, 101.7, 186 R, 189 R, 241/222, 223, 277

[56] References Cited
UNITED STATES PATENTS

| | | | |
|---|---|---|---|
| 1,726,435 | 8/1929 | Haller | 241/186 R X |
| 1,793,476 | 2/1931 | Gehl | 241/186 R X |
| 2,084,447 | 6/1937 | Matejcik | 241/223 X |
| 2,385,451 | 9/1945 | Krause et al. | 241/186 X |
| 2,900,069 | 8/1959 | Manns et al. | 241/101.7 X |
| 2,952,465 | 9/1960 | Skromme | 241/186 R X |
| 3,401,729 | 9/1968 | Wallin et al. | 241/60 |
| 3,552,463 | 1/1971 | Witt | 241/222 |

Primary Examiner—Granville Y. Custer, Jr.
Assistant Examiner—Howard H. Goldberg
Attorney, Agent, or Firm—Williamson, Bains & Moore

[57] ABSTRACT

A towed type wheeled chopping implement is adapted to be connected in trailing relation to a harvesting combine to receive leaves, stalks (such as stover) and the like, of the crop being harvested from the combine. The implement includes a hopper having a conveyor therein for conveying the stover (or crop leaves, stalks and the like) to driven feed rolls which direct the stover into a chopper device, where the stover is finely chopped. The chopped stover material is then directed by conveyor means to a blower device which blows the chopped stover material through a conduit into a collection structure such as a truck body or the like.

1 Claim, 4 Drawing Figures

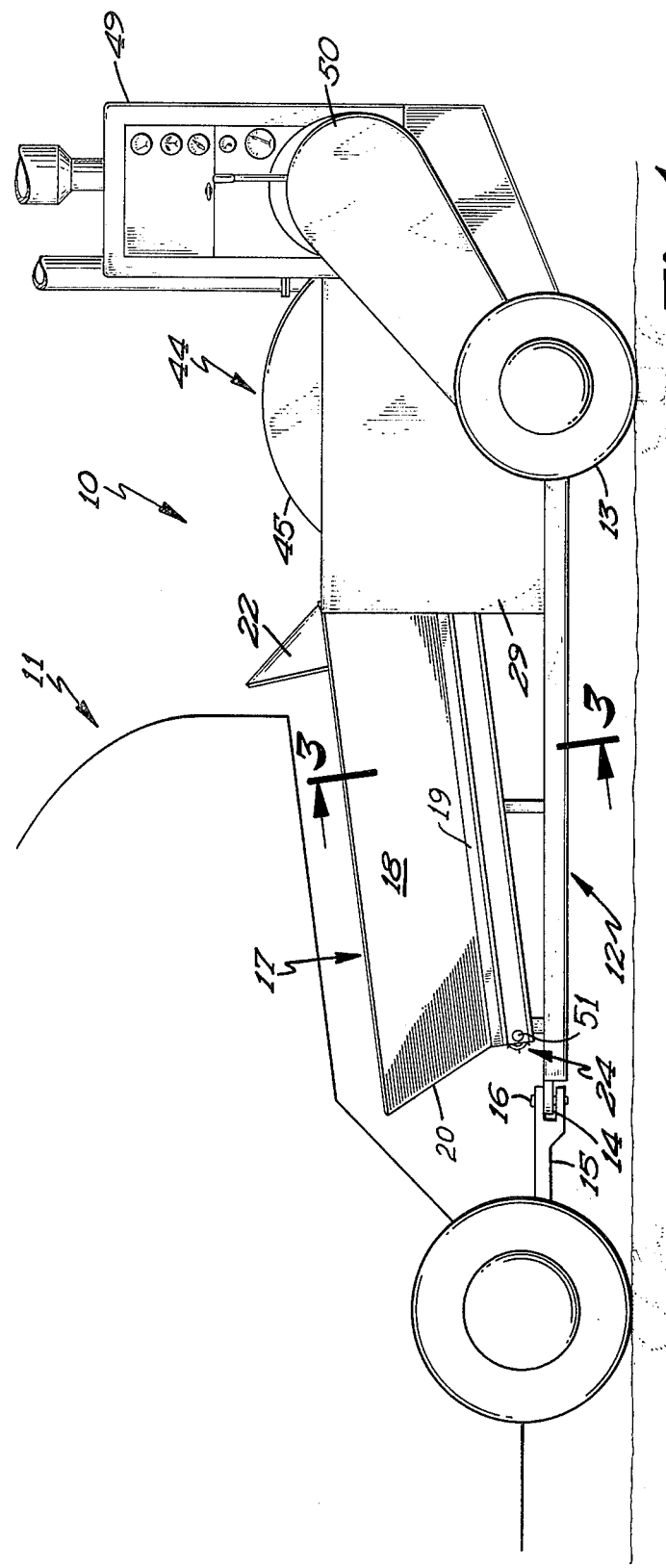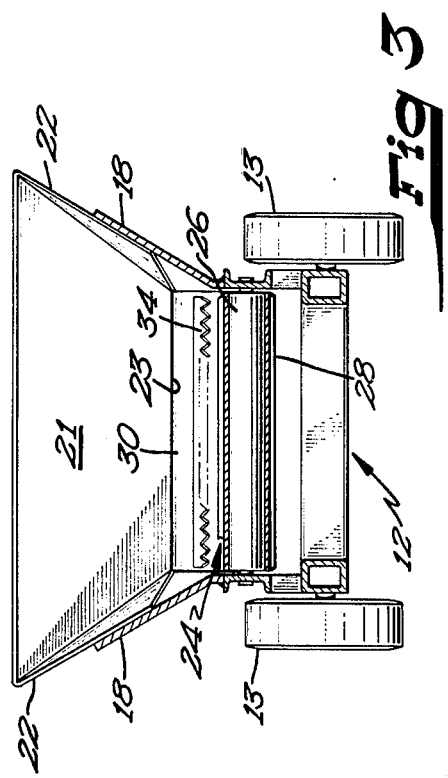

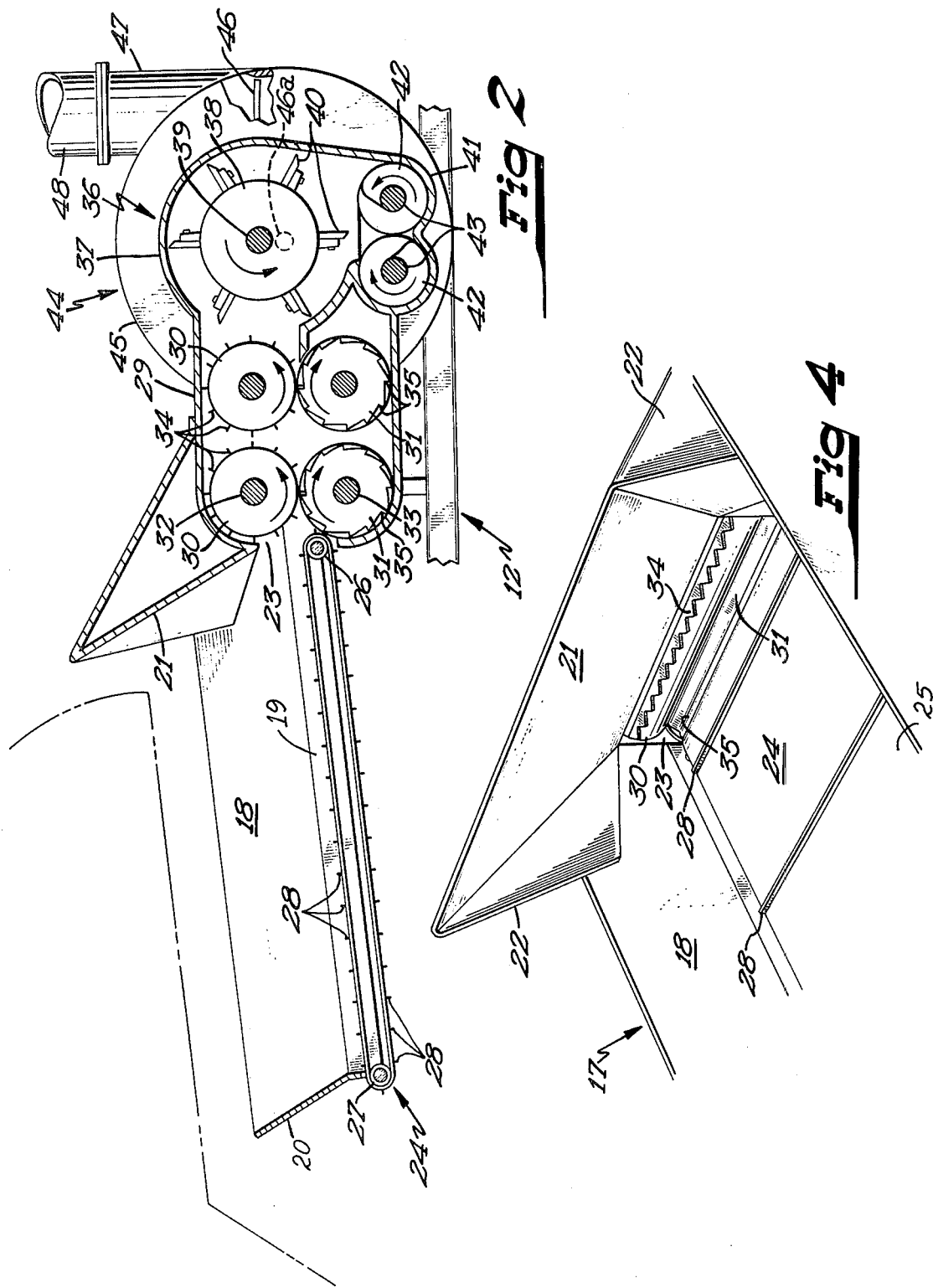

CHOPPING IMPLEMENT

This is a continuation of application Ser. No. 331,824, filed Feb. 12, 1973, now abandoned.

BACKGROUND OF THE INVENTION

This invention relates to a towed type wheeled cutting implement which is adapted to be connected to a harvesting combine for receiving stover material or the like from the combine, which is operable to finely chop the stover or similar material into a relatively small size so that the chopped material may be consumed by cattle.

In most harvesting operations, such as a corn husking operation, the corn is picked and the ears are either collected or shelled. The stalks, shucks and shelled ears are usually discharged from the rear of the combine upon the ground. This stover is sometimes collected for silage but since the stover is comprised of relatively large pieces, cattle quite often refuse to eat this material. When stover is allowed to lie upon the ground, sand becomes intermingled with the stalks and leaves and when this stover is later collected and then fed to cattle, the cattle sometimes develop sore mouth from the sand.

It has been found that stover is not only nutritious, but when chopped into a relatively fine condition, constitutes an excellent cattle feed. Thus, it becomes quite economical to collect and chop the stover during the harvesting operation.

SUMMARY OF THE INVENTION

It is therefore an object of this invention to provide a novel towed type cutting implement which is connected in trailing relation to a harvesting combine to receive the stover or similar material from the combine, and then to chop the stover material into a relatively small size so that it may be used as a cattle feed. The present implement is provided with a collection hopper having a conveyor therein which receives the stover or similar material from the combine and then directs the stover by suitable driven feed rolls to a cutting chamber where the stover material is finely chopped. The finely chopped stover material is then directed by conveyor means to a blower device where it is blown through a conduit and directed into a truck body or the like. The hopper and conveyor structures of the present implement may be readily removed therefrom to permit a cutting head to be mounted on the implement so that the implement may function as a forage harvestor. These and other objects and advantages of this invention will more fully appear from the following description made in connection with the accompanying drawings wherein like reference characters refer to the same or similar parts throughout the several views.

FIGURES OF THE DRAWING

FIG. 1 is a side elevational view of the novel implement illustrated in connected relation with a combine;

FIG. 2 is a cross sectional view of a portion of the implement;

FIG. 3 is a vertical transverse cross sectional view taken approximately along line 33 in FIG. 1 and looking in the direction of the arrows and FIG. 4 is a perspective view of a fragmentary portion of the implement illustrating certain details of construction thereof.

DESCRIPTION OF THE PREFERRED EMBODIMENTS

Referring now to the drawings and more specifically to FIG. 1, it will be seen that one embodiment of the novel wheeled chopper implement, designated generally by the reference numeral 10, is there shown. The chopper implement 10 is adapted for use with a harvesting combine 11 such as the large commercially available combines which are used in relatively large combining operations. The chopper implement 10 includes a frame 12 provided with a pair of ground engaging wheels 13 to permit the implement to travel over the surface of the ground. Implement frame 12 is provided with a hitch member 14 at its front end which is interconnected to a hitch element 15 located at the rear of the harvesting combine 11 by pivot or clevis 16. With this arrangement, the chopper implement 10 is connected in trailing relation to the harvesting combine by an articulated coupling.

The chopper implement 10 includes an upwardly open hopper 17 whose width and length dimension are of a size slightly larger than the downwardly facing discharge opening of the combine housing through which the stover is discharged. The hopper 17 includes side walls 18 which converge downwardly and terminate in substantially parallel lower side portions 19. Each side of the hopper may be detachably connected to the frame by suitable bolts or the like. The hopper 17 also includes a front wall 20 which extends downwardly and rearwardly and whose lower edge terminates a point located above the lower edge of the lower side wall portions 19.

The rear wall of the hopper defines a deflector shield 21 which extends forwardly and upwardly, as best seen in FIGS. 3 and 4. The deflector shield 21 also includes side portions 22 which extend forwardly and outwardly and are integral with the side walls. Thus the deflector shield has a generally concave forward configuration.

The hopper 17 has a rearwardly facing opening 23 which is defined by the lower edge of the deflector shield and the side walls of the hopper. A horizontally disposed conveyor 24 extends from the rearwardly facing opening 23 in a forward direction and projects forwardly beyond the lower edge of the front wall 20 of the hopper. The conveyor 24 includes an endless conveyor belt or apron 25 which is trained about a driven roller 26 and an idler roller 27, these rollers being journaled for rotation on the implement frame. The endless conveyor belt 25 is provided with a plurality of longitudinally spaced apart transverse conveyor elements 28 which facilitate movement of the stover material rearwardly from the hopper. In this respect, it will be noted that the conveyor actually defines the lower wall of the hopper.

The chopper implement 10 also includes a feed roll housing 29 comprised of opposed side walls, upper and lower walls and a front wall, the latter having an opening therein which communicates with the rearwardly facing opening 23 in the hopper. The feed roll housing 29 has a pair of longitudinally spaced apart upper feed rolls 30 positioned therein and a pair of longitudinally spaced apart lower feed rolls 31 positioned therein. It will be noted that these rolls are horizontally oriented and extend transversely of the housing as best seen in FIG. 2. Each of the upper feed rolls 30 is provided with a shaft 32 which is journaled in suitable bearings carried by the sides of the feed roll housing while the lower feed rolls are each provided with a shaft 33 similarly journaled in bearings carried by the side walls. The upper feed rolls are each provided with a plurality of circumferencely spaced apart axially extending serrated blades 34 while each of the lower feed rolls is provided with a plurality of elongate axially extending blades 35. These feed rolls receive the stover material from a hopper conveyor and each is driven in a direction so that the stover material is impelled between each upper and lower pair of rolls in a rearward direction.

The stover material is impelled rearwardly by the feed rolls to a chopper device 36 which is comprised of a housing 37 having an inlet opening therein which communicates with the feed roll housing 29. The chopper device 36 includes a revolvable chopper drum 38 provided with a shaft 39 which is journaled in suitable bearings carried by the side walls of the chopper device housing. The chopper drum 38 is provided with a plurality of blades 40 which are affixed to the surface thereof and which project outwardly therefrom. Each of these blades extend longitudinally of the chopper drum and follows a somewhat helical pattern. The chopper device is operated at a speed to cause the stover material to be chopped into fairly small pieces and preferably wherein the particle size be approximately one-fourth inch.

The chopper device housing 37 communicates downwardly with a conveyor housing 41 which extends below the chopper device housing and which contains a pair of auger conveyors 42. The shafts 43 of the auger conveyors are journaled in suitable bearings carried by the side walls of the auger conveyor housing and these conveyors are rotated to convey the material transversely of the chopper implement towards one side thereof. A blower device 44 is mounted on one side of the chopper implement and includes a housing 45 in which is positioned a fan 46. The shaft 46a of the fan is journaled in suitable bearings and the fan housing is provided with a tubular tangential discharge outlet 47.

The discharge outlet 47 projects upwardly and is provided with an outturned flange to facilitate connection of the outlet with an elongate conduit 48. Although not shown in the drawing, the upper end of the conduit is preferably curved and is adjustable to permit adjustment of the direction of discharge of the material from the conduit. The chopper implement is provided with a relatively large diesel engine 49 for driving the various components thereof, suitable drive connections being contained within the drive housing 50. In this regard, the diesel engine 49 not only drives the blower fan 46 and chopper device 36, but also drives the feed rolls, the auger conveyors 42, and the apron conveyor 24. In this respect, the front end of each shaft of each component may be provided with a pulley about which is trained a drive belt which is drivingly connected to the diesel engine 49 through the drive connections located within the drive housing 50.

In use, the chopper implement 10 will be positioned in articulated trailing relation with respect to a conventional harvesting combine 11. When so connected to the harvesting combine, the hopper 17 will be positioned below the discharge outlet of the hopper housing through which the stover is normally discharged. It is preferred that the head for the combine be capable of cutting the corn stalk fairly close to the surface of the ground rather than the cutting action performed by the conventional corn picking head which cuts the stalk at a substantially higher elevation. It is also preferred that the combine be capable of shelling the corn so that the shelled cobs may be collected as part of the stover material. Since the combine will be gathering substantially the entire stalk, the material will be passed through the combine along with the shucks and cobs. This material will be discharged directly into the hopper 17 and will be conveyed rapidly to the feed rolls by the conveyor 24. The stover material is then impelled into the chopper device where the stover is chopped into relatively fine particles, preferably of ¼ inch size. The chopper material falls into the conveyor housing where it is conveyed rapidly into the blower housing. There the chopped material is entrained in a stream of air and directed through the conduit outwardly into a collection vehicle such as a truck body or the like.

It is pointed out that the present implement may also be used to collect and finely chop leaves, stems and stalks for crops other than corn. For example, the chopper implement may be used for beans, maize and the like.

It has been found that the finely chopped stover material not only has a high nutritional value, per se, but when the proper additives are supplied, the stover material constitutes an excellent cattle feed. Therefore, based on the normal expected yield for a corn crop, the yield of stover material from one acre provides sufficient food (with suitable additives) for one animal for one entire year.

The chopper implement 10 may also be converted into a forage harvester by merely removing the hopper 17 and the conveyor 24 from the implement frame and substituting a cutting head for these components. This may be accomplished by disengaging the mounting bolts 51 which permit the hopper to be removed from the frame. Thereafter, the conveyor 24 may be removed and a suitable forage harvester cutter head may be provided. The forage harvester will be provided with an offset hitch so that it may be connected in offset trailing relation with a tractor.

From the foregoing description, it will be seen that I have provided a novel chopper implement which is adapted for use with a conventional harvesting combine and which permits stover and similar material to be collected and finely chopped to form an excellent cattle feed. It will also be seen that the novel chopping implement is also convertible into a forage harvester through the removal and substitution of certain parts.

Thus it will be seen that I have provided a chopper device which utilizes a new concept in the provision of the production of cattle feed.

What is claimed is:

1. A towed type chopping machine adapted to be connected in trailing relation to a harvesting combine for receiving from the combine the leaves, stalks and the like such as stover of the crop being harvested, the harvesting combine including a housing having a downwardly facing opening of predetermined size adjacent the rear end of the combine housing, comprising:

a frame,
   ground engaging wheels on said frame,
a hitch mounted on the front of said frame and projecting forwardly therefrom for connection to the rear end of a harvesting combine,
an elongate hopper mounted on said frame adjacent the front end thereof, said hopper having elongate side walls and a front end wall and having length and width dimensions slightly larger than the corresponding dimensions of the downwardly facing discharge opening of a combine housing, the front and side walls of said hopper having lower edges, the lower edge of said front wall being located above the lower edge of said side walls, said hopper being positioned below the discharge opening of a combine to receive therefrom stover or the like, such as stalks, leaves, shelled ears, and shuck, said hopper having a rearwardly facing discharge opening thereon, generally horizontally oriented endless belt conveyor positioned in said hopper and extending in a fore and aft direction, and projecting longitudinally beyond the lower edge of said hopper front wall, said belt conveyor having a plurality of longitudinally spaced apart transversely extending conveyor elements affixed thereto to facilitate conveying the stover or other material in a rearward direction through the discharge opening in said hopper, said hopper and belt conveyor being readily removable from the implement frame, deflector secured to said hopper and extending upwardly and forwardly from the rear end of said hopper and and deflecting the stover and other material from a combine downwardly upon said conveyor, said deflector including forwardly projecting side portions secured to the side walls of the hopper and having a lower edge, the latter defining the upper edge of said discharge opening, a housing on said frame and having a forwardly facing opening therein, a pair of vertically arranged driven feed rolls positioned in said housing closely adjacent the rear end of said conveyor and receiving the stover or similar material from the conveyor, a driven rotary chopper device positioned in said housing rearwardly of the feed rolls to receive the stover or similar material therefrom, and being operable to chop the stover or similar material into fine particles, a second conveyor means positioned adjacent the chopper housing and receiving the chopped stover material from the chopper device, a blower mechanism including a blower housing mounted on one side of said first mentioned housing and connected with said second conveyor means and receiving said chopped mateiral therefrom, fan in said blower housing for entraining the chopped material in a stream of air, and conduit connected to said blower housing through which the air entrained chopped material passes.

* * * * *